US 12,544,936 B2

(12) United States Patent
Morita

(10) Patent No.: US 12,544,936 B2
(45) Date of Patent: Feb. 10, 2026

(54) ROTATION POSITION DETECTION UNIT

(71) Applicant: RIVERFIELD INC., Tokyo (JP)

(72) Inventor: Naoya Morita, Tokyo (JP)

(73) Assignee: RIVERFIELD INC., Tokyo (JP)

( * ) Notice: Subject to any disclaimer, the term of this patent is extended or adjusted under 35 U.S.C. 154(b) by 723 days.

(21) Appl. No.: 17/940,437

(22) Filed: Sep. 8, 2022

(65) Prior Publication Data
US 2023/0001588 A1 Jan. 5, 2023

Related U.S. Application Data

(63) Continuation of application No. PCT/JP2020/011794, filed on Mar. 17, 2020.

(51) Int. Cl.
| | |
|---|---|
| B25J 13/00 | (2006.01) |
| A61B 34/30 | (2016.01) |
| B25J 9/10 | (2006.01) |
| B25J 13/08 | (2006.01) |
| H02K 7/10 | (2006.01) |
| H02K 11/22 | (2016.01) |

(52) U.S. Cl.
CPC .............. *B25J 13/088* (2013.01); *A61B 34/30* (2016.02); *B25J 9/104* (2013.01); *H02K 7/1004* (2013.01); *H02K 11/22* (2016.01)

(58) Field of Classification Search
CPC ......... B25J 13/088; B25J 9/104; H02K 11/22; H02K 7/1004; A61B 34/30
See application file for complete search history.

(56) References Cited

U.S. PATENT DOCUMENTS 8,500,823 B2 * 8/2013 Herr .......................... A61F 2/70
623/44
2017/0348062 A1 * 12/2017 Sweeney, II ........... A61B 34/32

FOREIGN PATENT DOCUMENTS

| CN | 109091231 A | * 12/2018 | ....... A61B 17/00234 |
| JP | 8-126989 A | 5/1996 | |
| JP | 2015-080845 A | 4/2015 | |
| WO | 2016/051494 A1 | 4/2016 | |
| WO | WO-2017026167 A1 | * 2/2017 | ......... A61B 17/2909 |

OTHER PUBLICATIONS

International Search Report for PCT/JP2020/011794 dated Jun. 16, 2020.
Written Opinion for PCT/JP2020/011794 dated Jun. 16, 2020.

* cited by examiner

*Primary Examiner* — Zakaria Elahmadi
(74) *Attorney, Agent, or Firm* — Sughrue Mion, PLLC

(57) ABSTRACT

A rotation position detector includes a motor having a drive shaft extending along a first axis, a drive-side pulley that is connected to the drive shaft, a holder that holds a treatment tool to be inserted into a patient during surgery, the holder rotating in association with the drive-side pulley, a driven-side pulley that rotates around the first axis, a diameter of the drive-side pulley being smaller than a diameter of the driven-side pulley, a transmission belt that transmits a rotational drive of the drive-side pulley to the driven-side pulley, a rotary encoder that is provided on the first axis and detects a rotation angle of the driven-side pulley, and a controller that calculates a rotation position of the holder based on the rotation angle and based a pulley ratio of the drive-side pulley to the driven-side pulley, and controls the motor based on the rotation position.

19 Claims, 10 Drawing Sheets

【Figure 1】
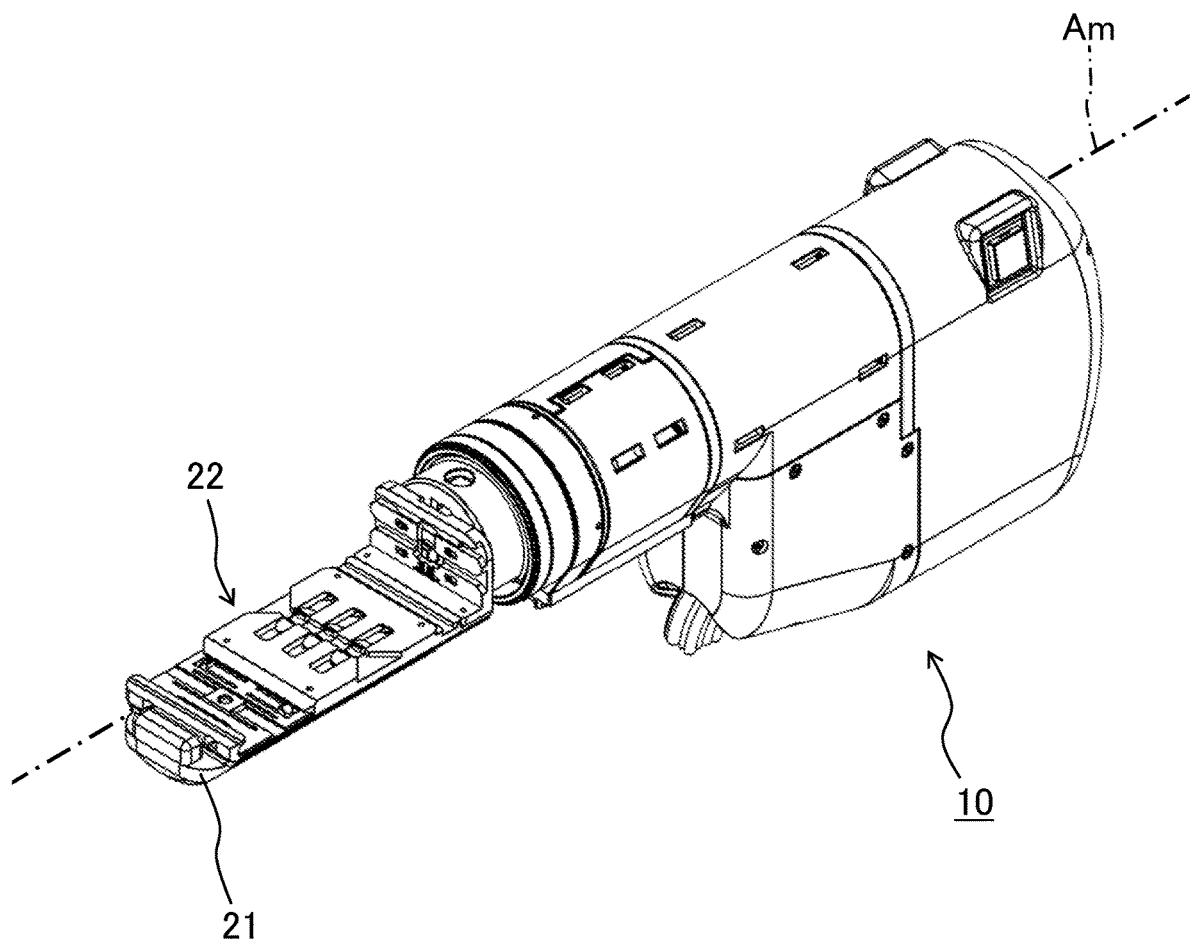
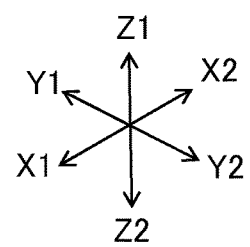

【Figure 2】
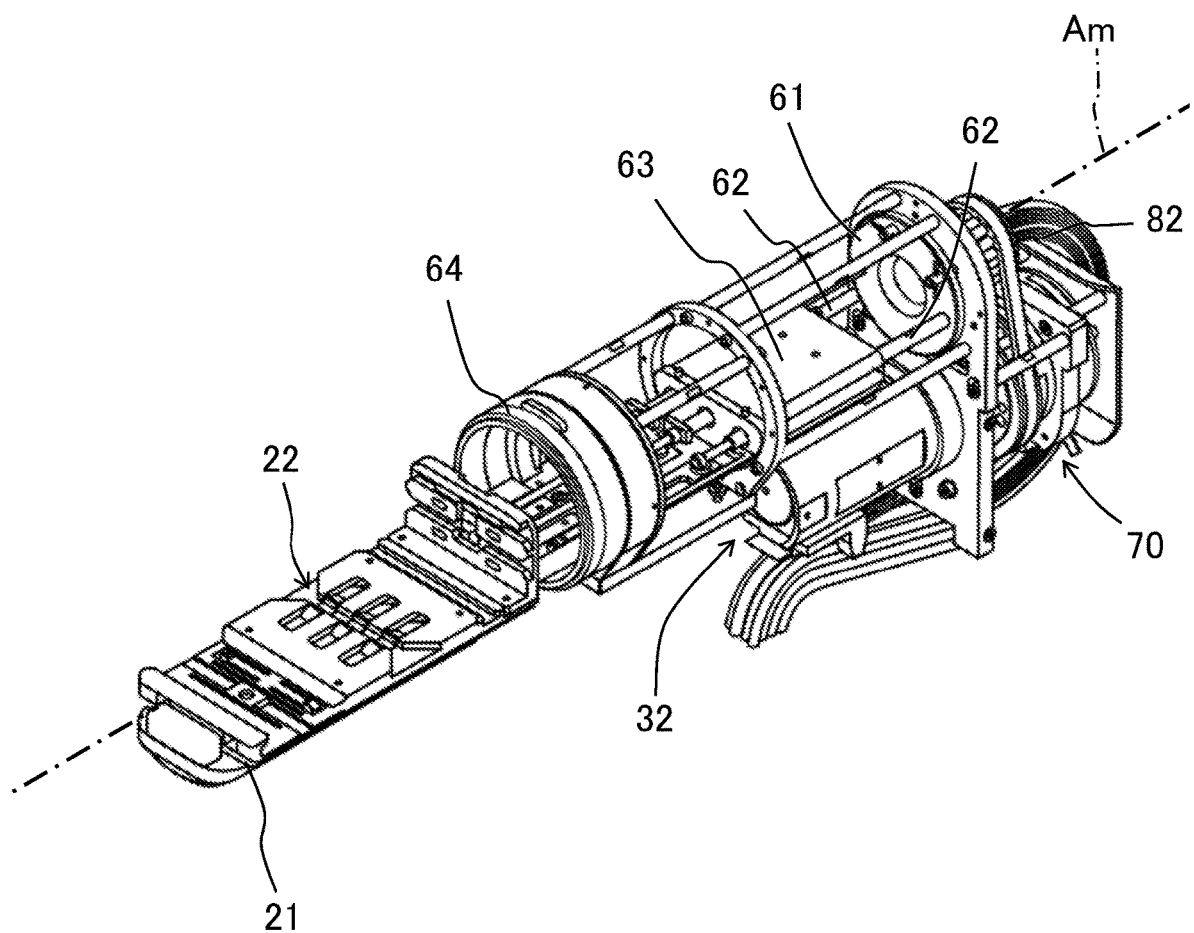
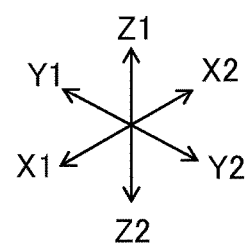

【Figure 3】
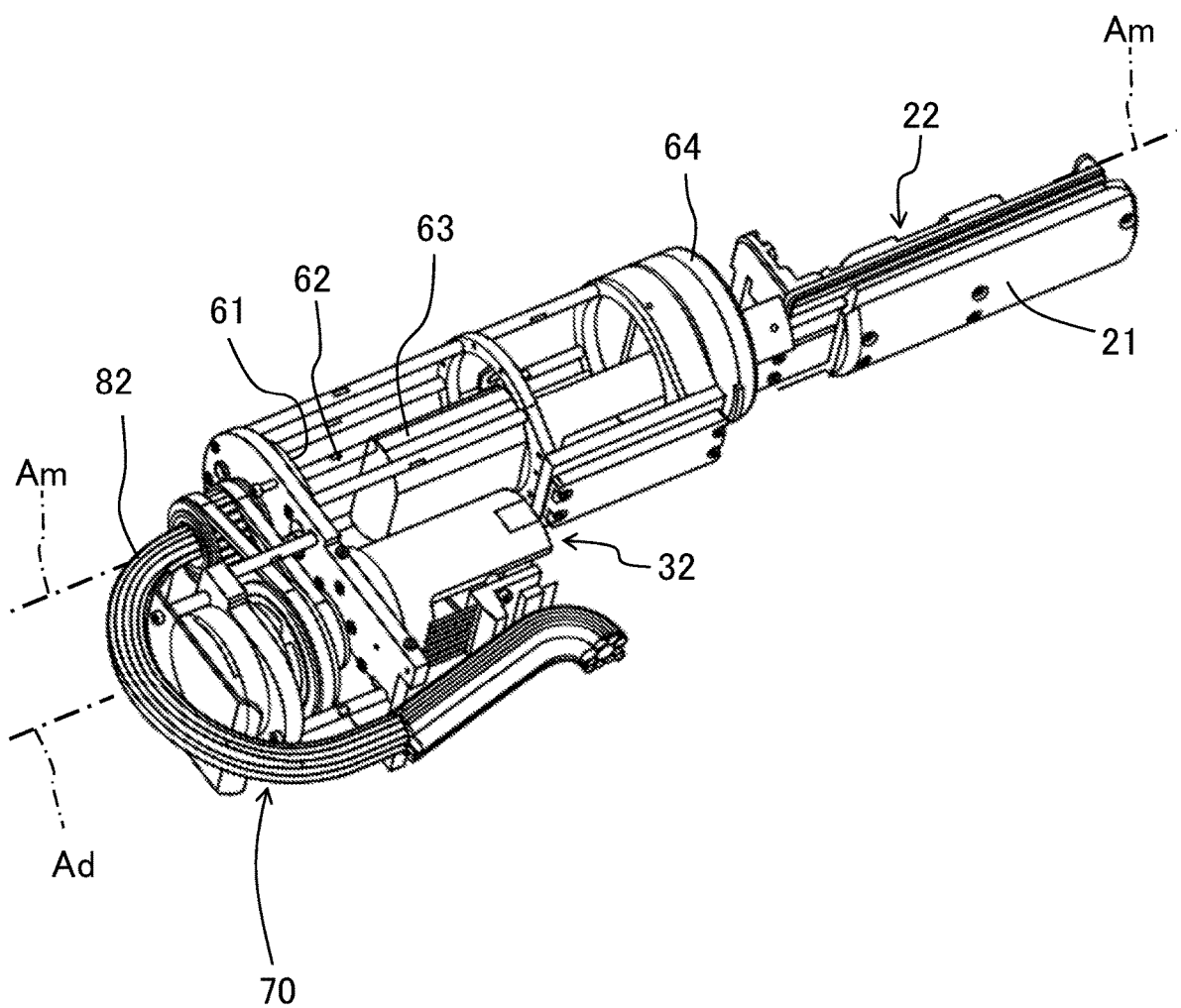

【Figure 4】
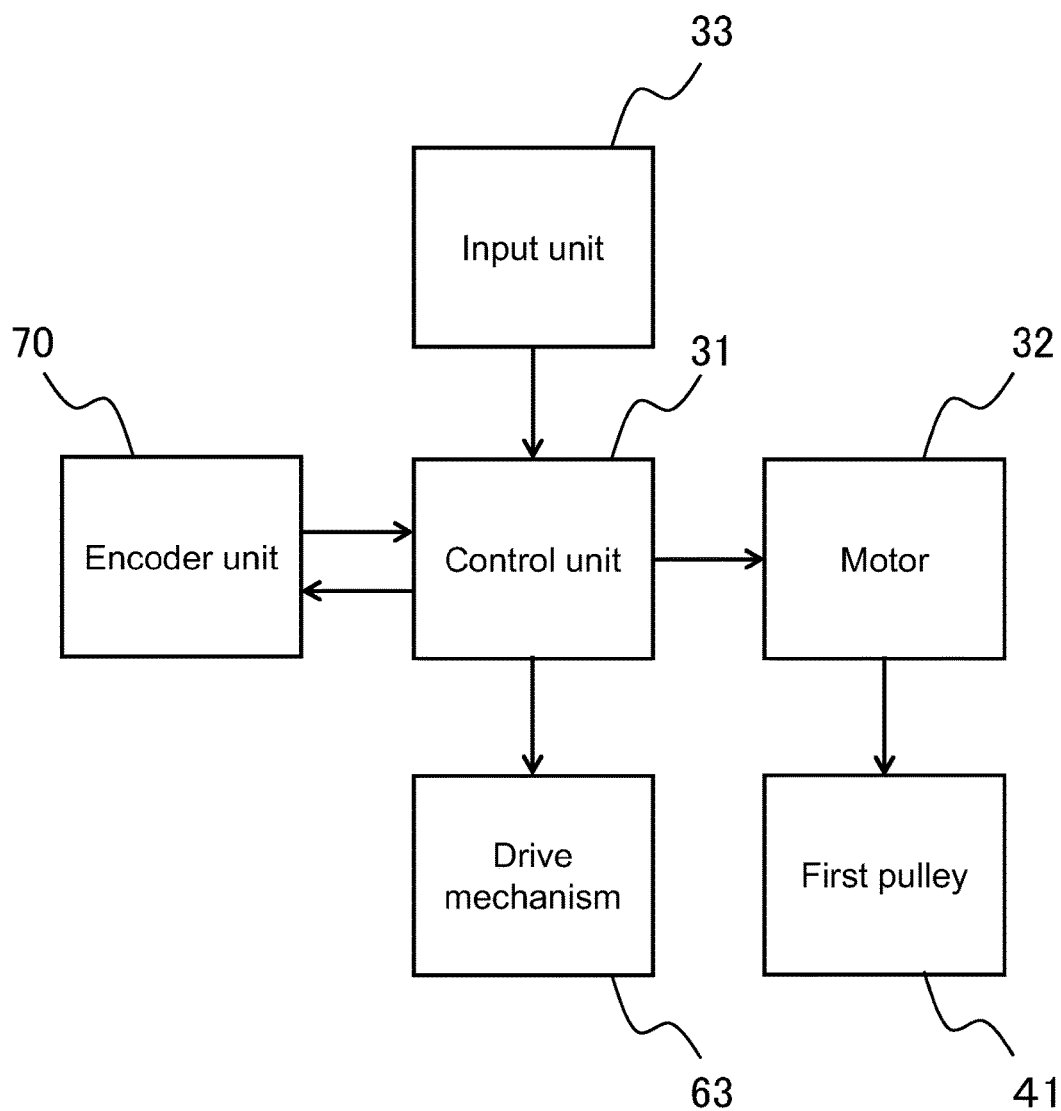

【Figure 5】
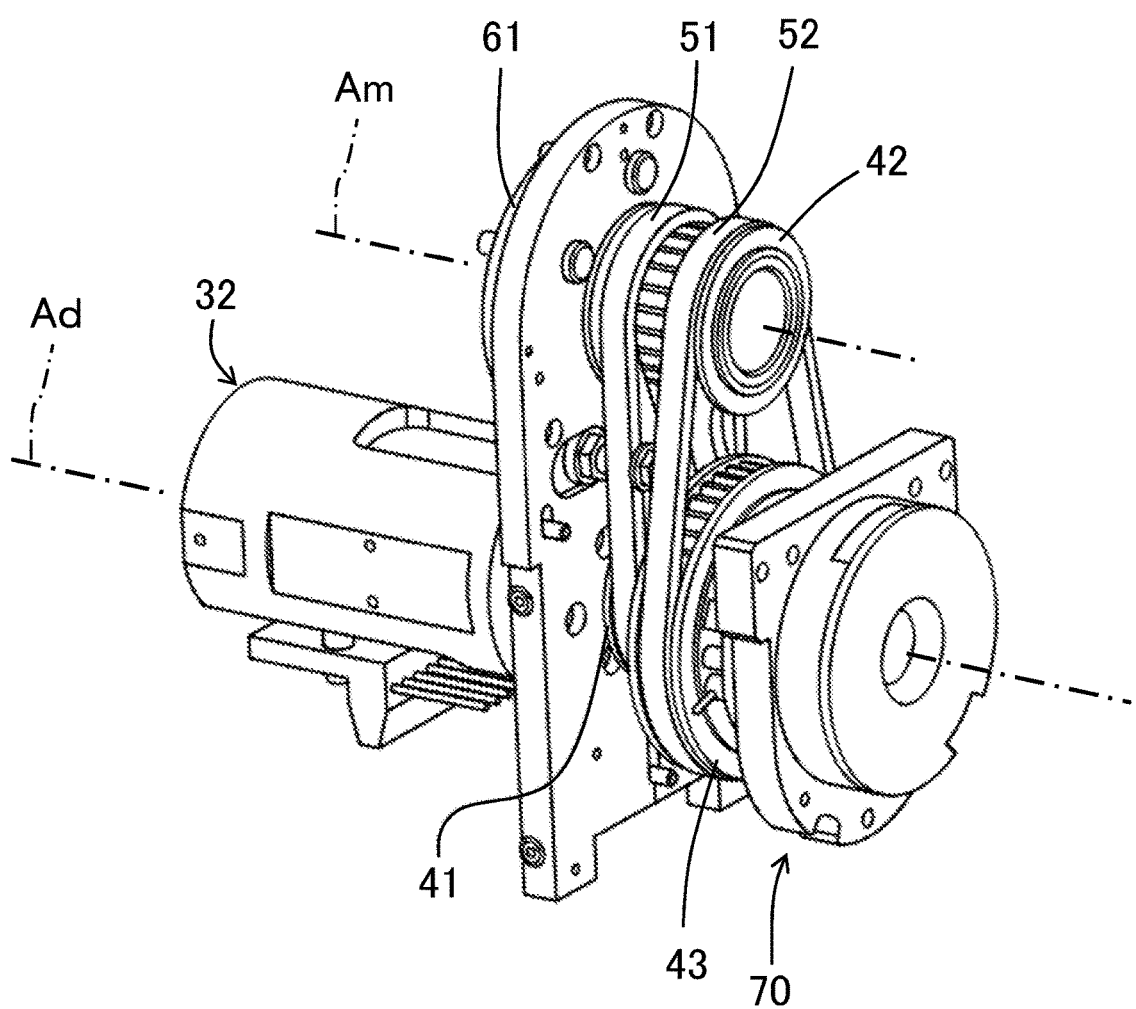
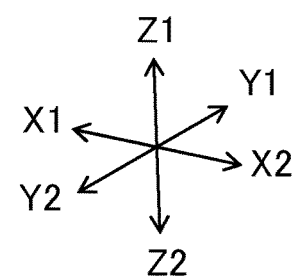

【Figure 6】
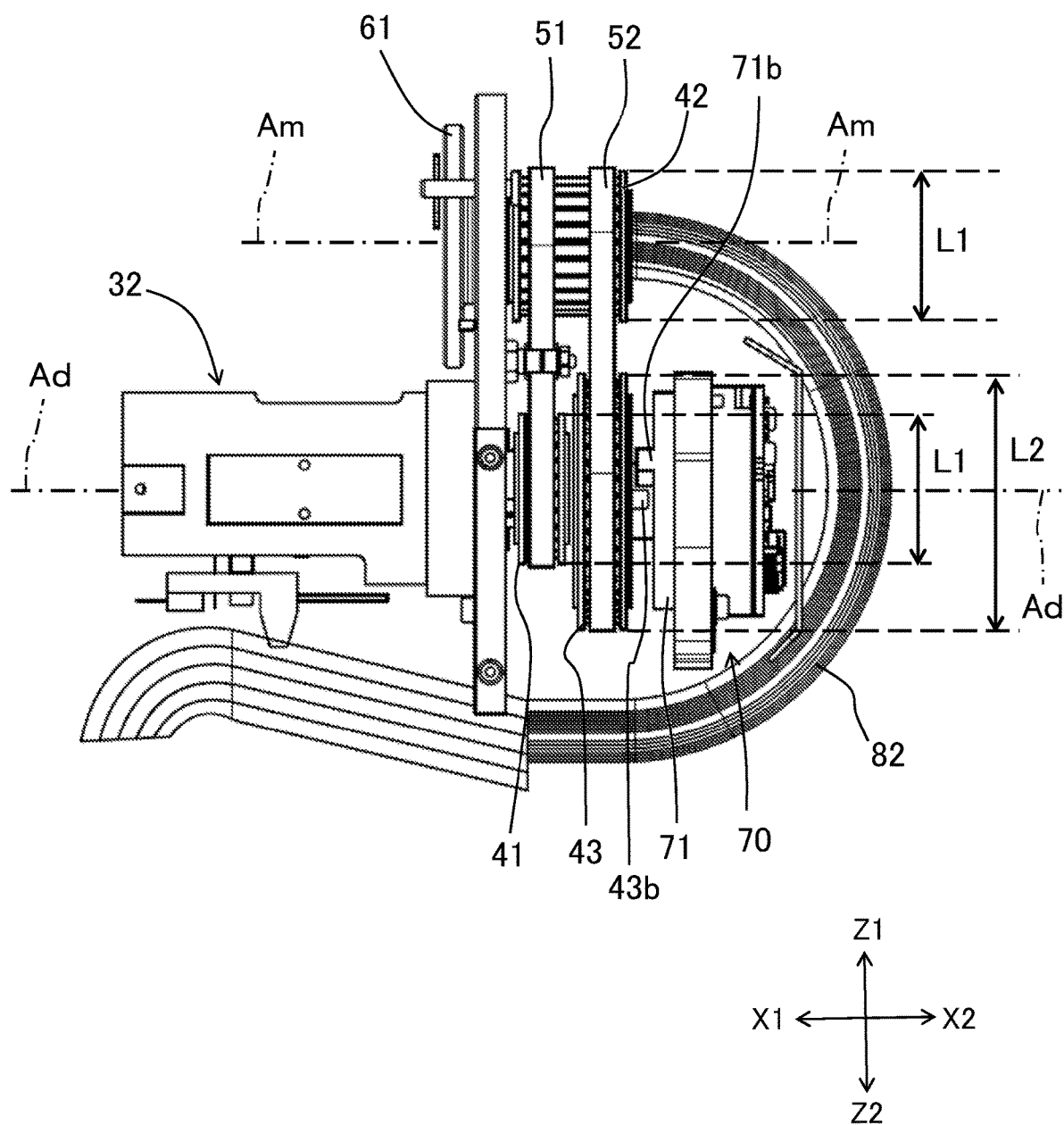

[Figure 7]
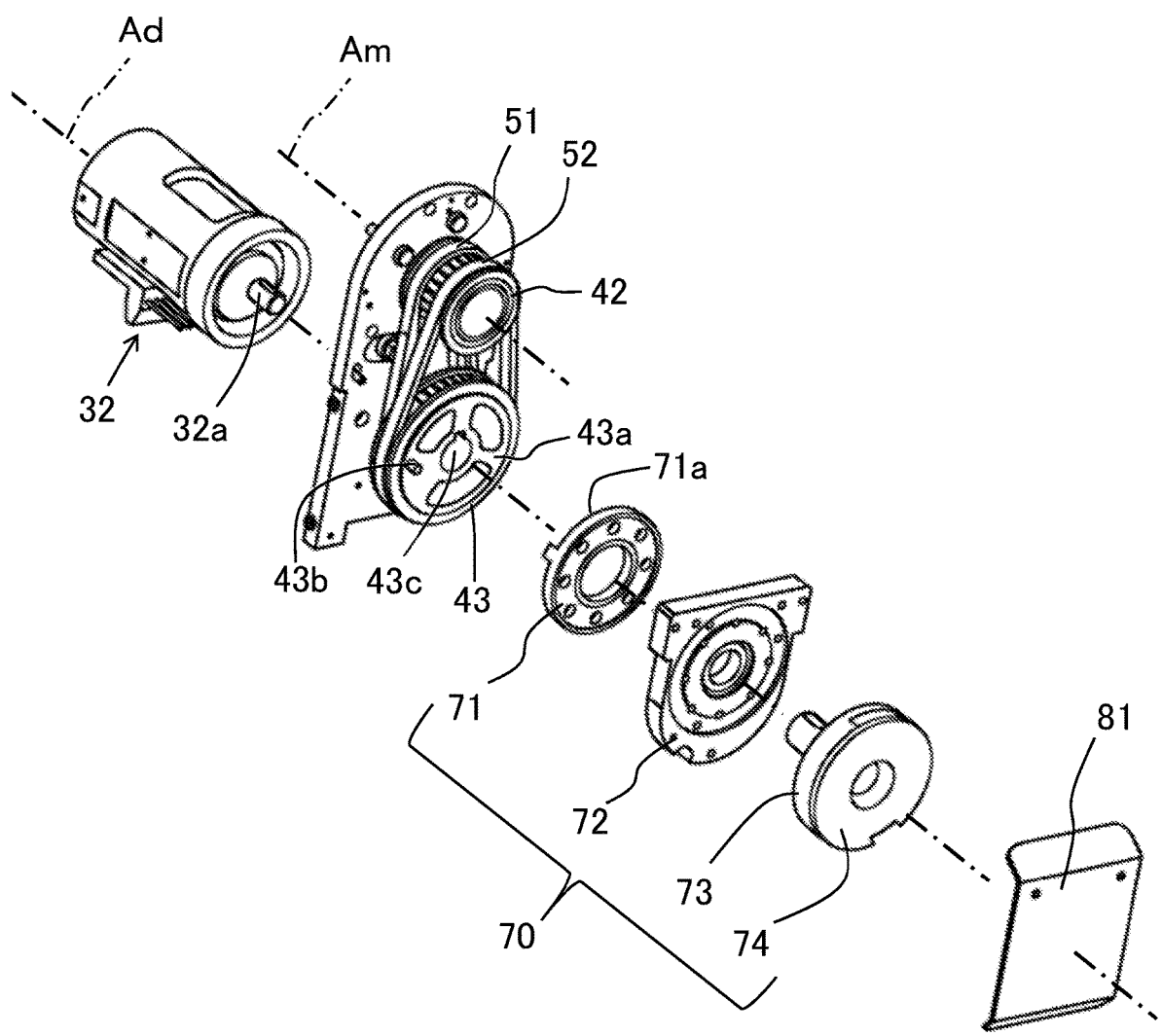

【Figure 8】
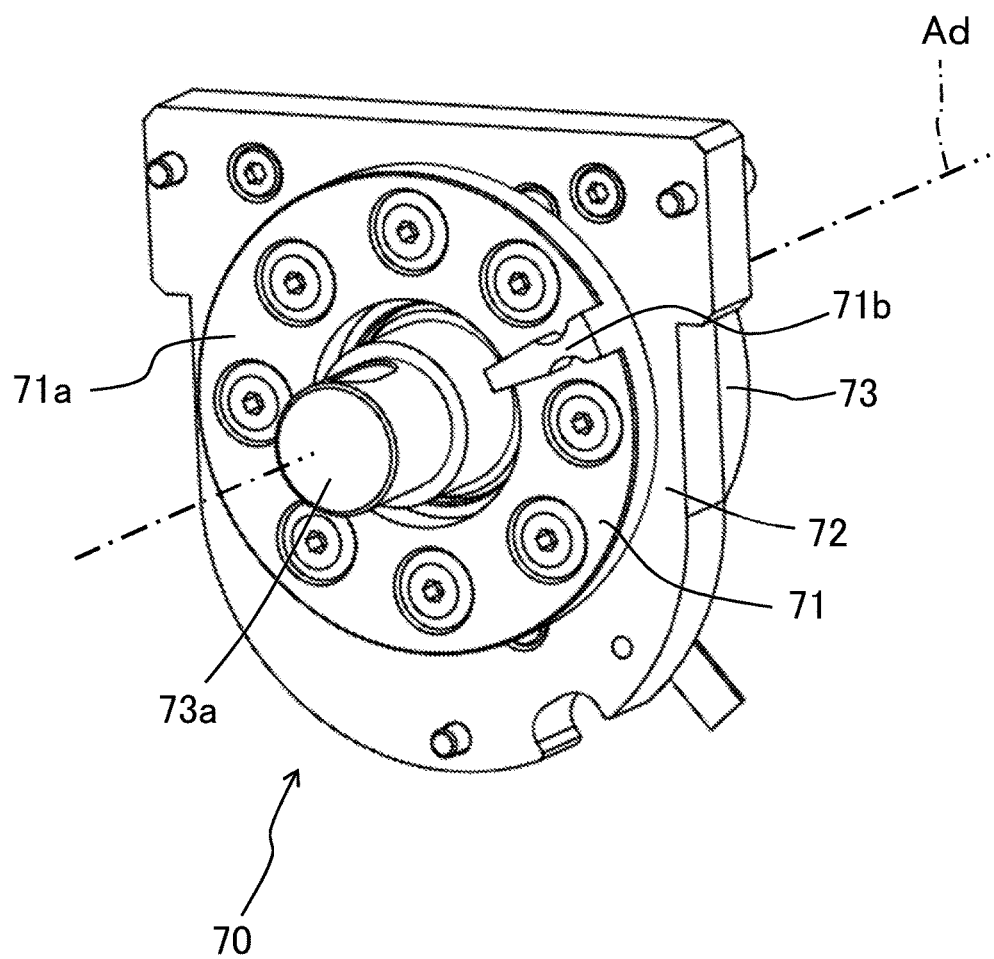
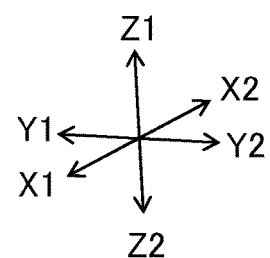

【Figure 9】
(a)
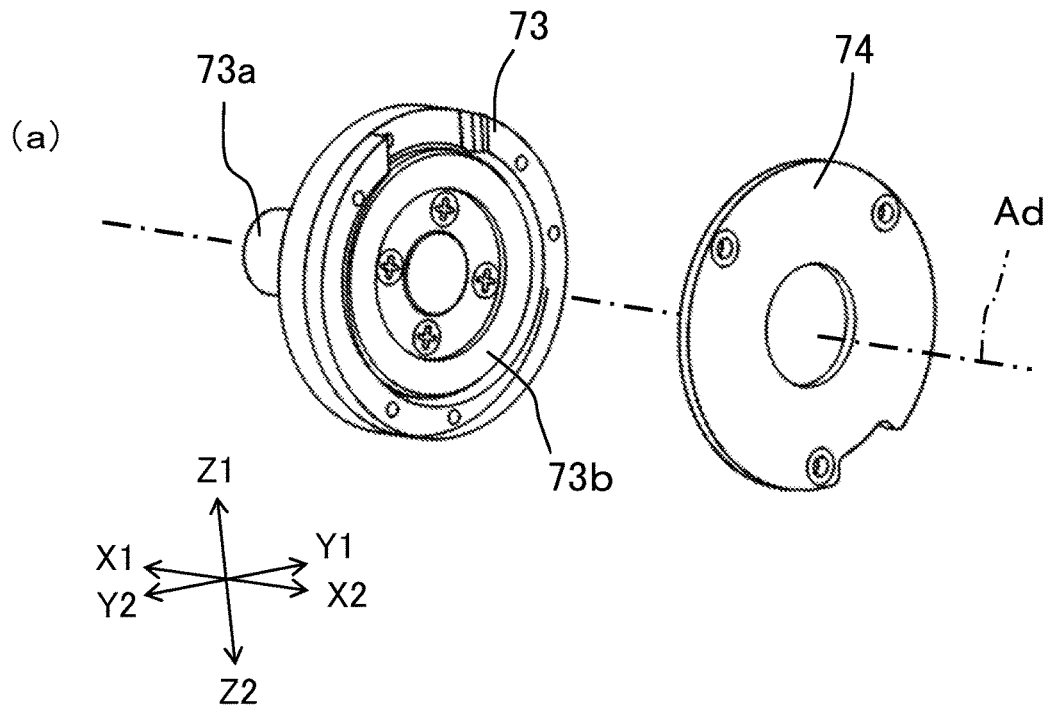
(b)
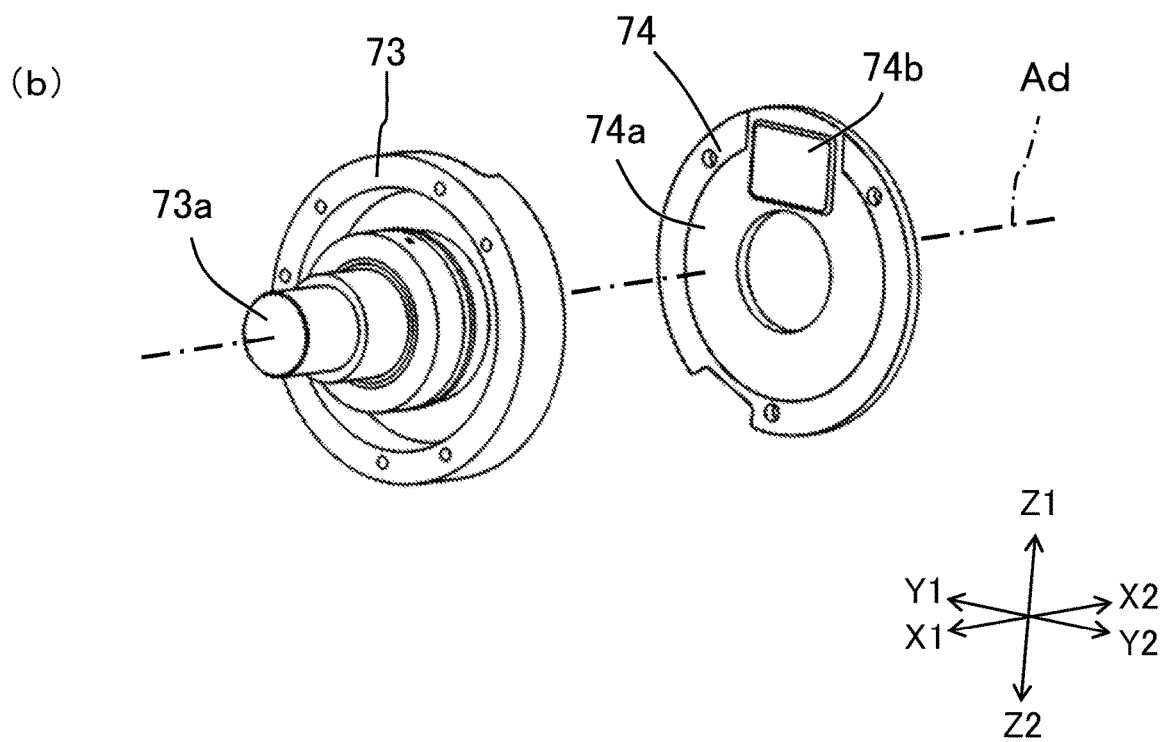

[Figure 10]
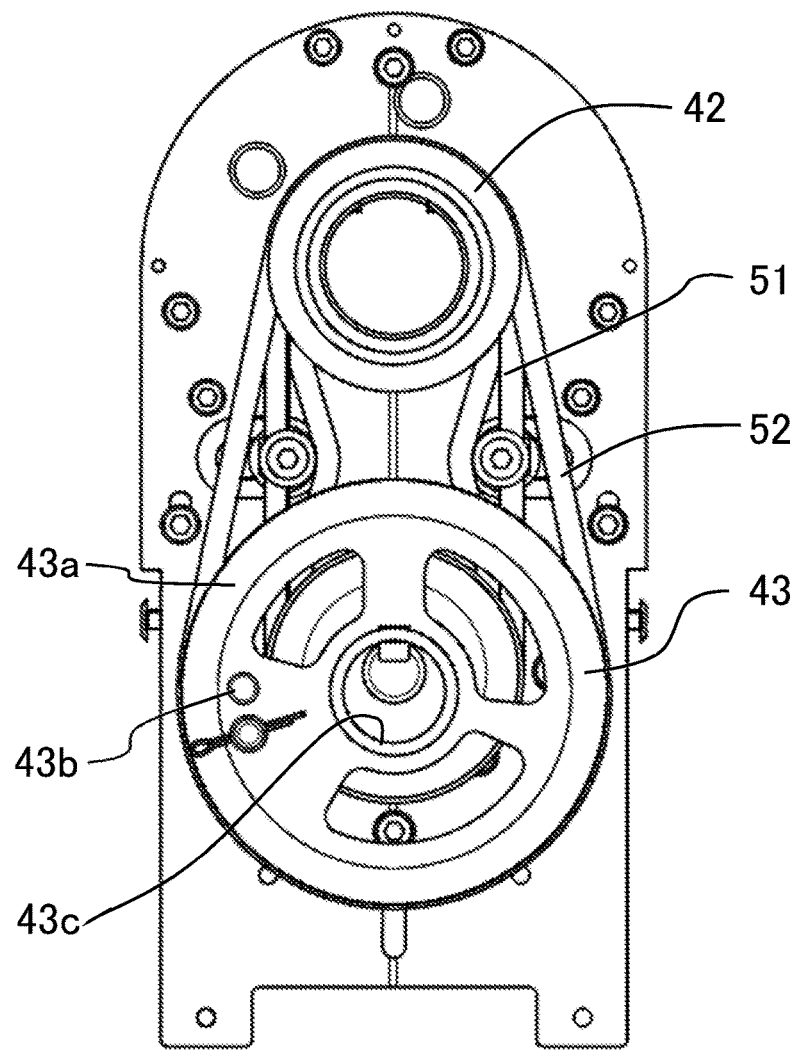
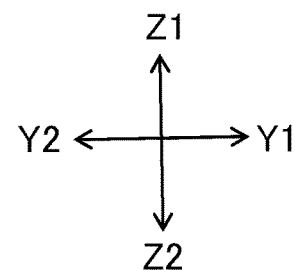

US 12,544,936 B2

ROTATION POSITION DETECTION UNIT

CROSS REFERENCE TO RELATED APPLICATIONS

This U.S. Application is a continuation application of International Application No. PCT/JP2020/011794 filed Mar. 17, 2020, in the Japanese Patent Office, the contents of which being incorporated by reference herein in its entirety.

BACKGROUND

The present disclosure relates to a rotation position detection unit capable of detecting a rotation position of an insertion member of a medical robot.

A surgical assistance robot includes an arm and an insertion member that is attached to the arm and that is inserted into a patient's body to perform a surgical operation. The insertion member may be rotated in order to perform the surgical operation.

SUMMARY

It is an aspect to provide a rotation position detection unit capable of detecting the rotation position of the insertion member that is to be inserted into the patient's body and can rotate 360 degrees or more in a simple and compact configuration in a medical robot that holds the insertion member in a rotatable manner.

According to an aspect of one or more embodiments, there is provided a rotation position detection unit provided in a medical robot in which an insertion member is held in a rotatable manner, the rotation position detection unit detecting a rotation position of the insertion member and comprising a motor; a drive-side pulley that is connected to the motor and rotationally driven by the motor around a drive shaft of the motor; a driven-side pulley that rotates around a first axis of rotation; a transmission belt that transmits a rotational drive of the drive-side pulley to the driven-side pulley; a rotary encoder that is connected to the first axis of rotation and detects a rotation angle of the driven-side pulley; and a controller that controls drive of the motor and to which a detection result by the rotary encoder is input, wherein the insertion member rotates in association with a rotation of the drive-side pulley, a diameter of the drive-side pulley is smaller than a diameter of the driven-side pulley, and the controller calculates the rotation position of the insertion member based on the rotation angle of the driven-side pulley and a pulley ratio obtained by dividing the diameter of the drive-side pulley by the diameter of the driven-side pulley.

According to an aspect of one or more embodiments, there is provided an apparatus comprising a holder that is configured to hold a treatment tool that is configured to be inserted into a patient during surgery; a motor; a drive-side pulley that is connected to the motor and rotationally driven by the motor around a drive shaft of the motor; a driven-side pulley that rotates around a first axis of rotation; a transmission belt that transmits a rotational drive of the drive-side pulley to the driven-side pulley; a rotary encoder that is connected to the first axis of rotation and detects a rotation angle of the driven-side pulley; and a controller that controls drive of the motor and to which a detection result by the rotary encoder is input, wherein the holder rotates in association with a rotation of the drive-side pulley, a diameter of the drive-side pulley is smaller than a diameter of the driven-side pulley, and the controller calculates a rotation position of the holder based on the rotation angle of the driven-side pulley and a pulley ratio of the diameter of the drive-side pulley to the diameter of the driven-side pulley.

According to an aspect of one or more embodiments, there is provided an apparatus comprising a motor having a drive shaft extending along a first axis; a drive-side pulley that is connected to the drive shaft of the motor; a holder that is configured to hold a treatment tool that is configured to be inserted into a patient during surgery, the holder rotating in association with the drive-side pulley; a driven-side pulley that rotates around the first axis, a diameter of the drive-side pulley being smaller than a diameter of the driven-side pulley; a transmission belt that transmits a rotational drive of the drive-side pulley to the driven-side pulley; a rotary encoder that is provided on the first axis and detects a rotation angle of the driven-side pulley; and a controller that calculates a rotation position of the holder based on the rotation angle and based a pulley ratio of the drive-side pulley to the driven-side pulley, and controls the motor based on the rotation position.

BRIEF DESCRIPTION OF THE DRAWINGS

The above and/or other aspects will become apparent and more readily appreciated from the following description of exemplary embodiments, taken in conjunction with the accompanying drawings in which:

FIG. 1 is a perspective view illustrating a configuration of a holding body of a medical robot including a rotation position detection unit according to some embodiments;

FIG. 2 is a perspective view illustrating a schematic configuration of inside of the holding body illustrated in FIG. 1, according to some embodiments;

FIG. 3 is a perspective view illustrating a schematic configuration of inside of the holding body illustrated in FIG. 1, according to some embodiments;

FIG. 4 is a functional block diagram of the medical robot including the rotation position detection unit according to some embodiments;

FIG. 5 is a perspective view illustrating a schematic configuration of the rotation position detection unit according to some embodiments;

FIG. 6 is a side view illustrating a schematic configuration of the rotation position detection unit according to some embodiments;

FIG. 7 is an exploded perspective view illustrating a schematic configuration of the rotation position detection unit according to some embodiments;

FIG. 8 is a perspective view illustrating a schematic configuration of a rotary encoder according to some embodiments;

FIGS. 9A and 9B are exploded perspective views illustrating a schematic configuration of the rotary encoder according to some embodiments;

FIG. 10 is a rear view illustrating a schematic configuration of pulleys and transmission belts according to some embodiments.

DETAILED DESCRIPTION

As described above, a surgical assistance robot may include an insertion unit, an arm unit, a light irradiation unit that emits a laser light beam having an optical axis parallel to the arm axis line, an imaging unit that captures a trajectory of an optical image created by the laser light beam, and a rotary drive motor that rotates the arm unit around a reference axis. The surgical assistance robot associates an operation input to the arm unit with a position-posture relationship to enable an intuitive operation of the arm unit to be realized.

In the surgical assistance robot, to associate the operation input to the arm unit with the position-posture relationship, a detection device for detecting the rotation position (rotation angle) of the arm unit is required. To this end, in recent years, there has been a demand for a rotation function in which the total rotation angle exceeds 360 degrees, for example, plus/minus 270 degrees with respect to the initial position.

However, the detection of a rotation position exceeding 360 degrees requires, for example, a configuration using a multi-encoder or a configuration in which a single-turn encoder is combined with a zero-point limit switch, and the detection device and peripheral mechanisms are therefore complicated, leading to an increased size. Furthermore, if the rotation exceeds 360 degrees, the wire harness around the detection device is greatly twisted, which may cause a problem such as disconnection. On the other hand, when a stopper mechanism for restricting the rotation amount of the wire harness is provided, there is a problem in that the size is further increased and the weight is also increased.

It is an aspect to provide a rotation position detection unit capable of detecting the rotation position of an insertion member that is to be inserted into the patient's body and can rotate 360 degrees or more in a simple and compact configuration in a medical robot that holds the insertion member in a rotatable manner.

A rotation position detection unit according to some embodiments may be provided in a medical robot in which an insertion member is held in a rotatable manner. The rotation position detection unit may detect a rotation position of the insertion member and may comprise a motor; a drive-side pulley that is connected to the motor and rotationally driven by the motor around a drive shaft of the motor; a driven-side pulley that rotates around a first axis of rotation; a transmission belt that transmits rotational drive of the drive-side pulley to the driven-side pulley; a rotary encoder that is connected to the first axis of rotation and detects a rotation angle of the driven-side pulley; and a controller that controls drive of the motor and to which a detection result by the rotary encoder is input. The insertion member may rotate in association with rotation of the drive-side pulley. The diameter of the drive-side pulley may be smaller than the diameter of the driven-side pulley. The controller may calculate the rotation position of the insertion member based on the rotation angle of the driven-side pulley and a pulley ratio obtained by dividing the diameter of the drive-side pulley by the diameter of the driven-side pulley.

In some embodiments, the rotation position detection unit may comprise an intermediate pulley that rotates around a second axis of rotation. In some embodiments, the insertion member may be connected to the second axis of rotation and rotates around the second axis of rotation. In some embodiments, the transmission belt may comprise a first transmission belt that connects the drive-side pulley and the intermediate pulley and transmits the rotational drive of the drive-side pulley to the intermediate pulley; and a second transmission belt that connects the intermediate pulley and the driven-side pulley and transmits the rotational drive of the intermediate pulley to the driven-side pulley. In some embodiments, the diameter of the intermediate pulley may be smaller than the diameter of the driven-side pulley.

In some embodiments, the diameter of the drive-side pulley and the diameter of the intermediate pulley may be identical.

In some embodiments, the pulley ratio may be set such that a rotation range of the driven-side pulley is less than 360 degrees even when a rotation range of the insertion member exceeds 360 degrees.

In some embodiments, the motor may be arranged on the insertion member side of the rotary encoder.

In some embodiments, the drive shaft and the first axis of rotation may be arranged so as to be located coaxially.

In some embodiments, the rotation position detection unit may comprise a restriction member that restricts a rotation range of the driven-side pulley.

In some embodiments, the rotary encoder may include a plate that faces the driven-side pulley in a direction along the first axis of rotation, and the restriction member may comprise a protrusion that is provided so as to extend toward the plate side in the driven-side pulley; and a restriction portion that is provided so as to extend toward the driven-side pulley side in the plate and arranged at a predetermined position on a trajectory of the protrusion that moves in association with rotation of the driven-side pulley.

According to the rotation position detection unit of various embodiments, it is possible to detect the rotation position of an insertion member that is to be inserted into the patient's body and the insertion member can rotate 360 degrees or more in a simple and compact configuration in a medical robot that holds the insertion member in a rotatable manner.

Hereinafter, the rotation position detection unit according to various embodiments will be described in detail with reference to the drawings. An example in which the rotation position detection unit is applied to a medical robot will be described, but embodiments are not limited to this.

In each figure, X-Y-Z coordinates are illustrated as reference coordinates. In the following description, the Z1-Z2 direction is referred to as an up-down direction, the X1-X2 direction is referred to as a front-rear direction, and the Y1-Y2 direction is referred to as a left-right direction. The X1-X2 direction and the Y1-Y2 direction are orthogonal to each other, and the X-Y plane including the X1-X2 direction and the Y1-Y2 direction is orthogonal to the Z1-Z2 direction. In FIGS. 2, 3, and 5 to 10, main constitutional members are illustrated, and illustration of shafts, screws, and other members is omitted.

The medical robot includes an arm unit that can change its direction and angle, and a holding body 10 illustrated in FIG. 1 is provided at the tip of the arm unit. From the front end of the holding body 10, a holder 21 and a separator 22 that is arranged so as to cover the holder 21 extend frontward. An insertion member inserted into the patient's body to be treated by the medical robot is detachably attached to the holder 21 by using the separator 22. The posture of the insertion member is changed in accordance with the changes of the direction and angle of the arm unit, and the insertion member rotates around an axis of rotation Am in accordance with the drive by a motor 32, as will be described later.

Examples of the insertion member includes a treatment tool and an endoscope used for the treatment.

The holder 21 is configured to be rotatable around the axis of rotation Am (second axis of rotation) along the front-rear direction by driving the motor 32 (see FIGS. 2 to 4) built in the holding body 10. As illustrated in FIG. 4, when the motor 32 receives a drive signal from a controller 31 and rotates in accordance with the drive signal, the holder 21 rotates around the axis of rotation Am. The controller 31 generates the drive signal for setting the rotation speed, rotation duration, drive interval, etc. of the motor 32 in accordance with an instruction signal from an input unit 33 operated by the practitioner or assistant and gives the drive signal to the motor 32. In some embodiments, the controller 31 may include one or more processors and a memory. The processor may be a central processing unit (CPU), a microprocessor, or a microcontroller executing program code stored in the memory to perform the functions of the controller 31 described herein, or may be hardware control logic configured to perform the functions of the controller 31.

As illustrated in FIGS. 5 to 7, the motor 32 has a drive shaft 32a (FIG. 7) to which a first pulley 41 as the drive-side pulley is connected, and the first pulley 41 is driven by the motor 32 to rotate around a central axis Ad (first axis of rotation) that is an extension of the central axis of rotation of the drive shaft 32a (drive shaft of the motor 32). That is, the central axis Ad (first axis of rotation) is located coaxially with the drive axis of the motor 32. The first pulley 41 is approximately disk-shaped, and its outer peripheral surface is formed with grooves having a constant pitch in the circumferential direction. The drive shaft 32a of the motor 32 extends along the front-rear direction (X1-X2 direction) and is arranged so as to be parallel to the above axis of rotation Am.

The first pulley 41 is connected to a second pulley 42 as the intermediate pulley via a first transmission belt 51, and the second pulley 42 is connected to a third pulley 43 as the driven-side pulley via a second transmission belt 52. The second pulley 42 and the third pulley 43 are each approximately disk-shaped, and their outer peripheral surfaces are each formed with grooves having a constant pitch in the circumferential direction.

As illustrated in FIG. 6, the first pulley 41 and the second pulley 42 have an identical diameter L1. The diameter L1 of the first pulley 41 and the second pulley 42 is set smaller than a diameter L2 of the third pulley 43. Therefore, while the pulley ratio obtained by dividing the diameter of the first pulley 41 by the diameter of the second pulley 42 is 1, the pulley ratio obtained by dividing the diameter of the first pulley 41 by the diameter of the third pulley 43 is smaller than 1.

The second pulley 42 is arranged above the first pulley 41 so as to be rotatable around the above axis of rotation Am. The first transmission belt 51 is looped between the outer peripheral surface of the first pulley 41 and the outer peripheral surface of the second pulley 42, and when the motor 32 drives the first pulley 41 to rotate around the central axis Ad, the drive force is transmitted to the second pulley 42 via the first transmission belt 51, and the second pulley 42 rotates around the axis of rotation Am. The rotation angle of the second pulley 42 is the same as the rotation angle of the first pulley 41 because the first pulley 41 and the second pulley 42 have the same diameter L1.

The third pulley 43 is arranged behind the first pulley 41 so as to be rotatable around the above central axis Ad. The second transmission belt 52 is looped between the outer peripheral surface of the second pulley 42 and the outer peripheral surface of the third pulley 43 behind the first transmission belt 51. When the second pulley 42 rotates around the axis of rotation Am, the drive force is transmitted to the third pulley 43 via the second transmission belt 52, and the third pulley 43 rotates around the central shaft Ad.

Therefore, when the motor 32 drives the first pulley 41 to rotate around the central axis Ad, the drive force is transmitted to the third pulley 43 via the first transmission belt 51, the second pulley 42, and the second transmission belt 52. The rotation angle of the third pulley 43 is smaller than the rotation angle of the first pulley 41 and the second pulley 42 because the diameter L1 of the first pulley 41 and the second pulley 42 is smaller than the diameter L2 of the third pulley 43.

By setting the same diameter L1 of the first pulley 41 and the second pulley 42, the rotation angles can be the same, and it is therefore easy to perform the rotation control of the insertion member. That is, if the diameters of the first pulley 41 and the second pulley 42 are different, complicated control will be required with consideration for the pulley ratio therebetween, but by setting the same diameter of the first pulley 41 and the second pulley 42, it suffices to perform the control with consideration only for the pulley ratio between the second pulley 42 and the third pulley 43, and easy control is thus possible.

When the second pulley 42 rotates, a drive plate 61 (see FIGS. 2, 3, 5, and 6) coupled to the second pulley 42 also rotates around the axis of rotation Am in front of the second pulley 42. As illustrated in FIG. 2, the front surface of the drive plate 61 is provided with a plurality of connection shafts 62 that extend frontward, and the front ends of the connection shafts 62 are provided with a driver 63 that is connected to the separator 22 to drive it back and forth. The drive plate 61, the connection shafts 62, and the driver 63 are configured to be rotatable as one body around the axis of rotation Am in the holder 10 via a bearing 64 provided in the holder 10. With this configuration, when the second pulley 42 rotates, the holder 21 and the separator 2 also rotate around the axis of rotation Am via the drive plate 61, the connection shafts 62, and the driver 63, and the insertion member attached to the separator 22 rotates accordingly.

As illustrated in FIG. 4, the controller 31 provides a control signal to the driver 63 via a cable 82, and the driver 63 is driven in accordance with the control signal. By driving the driver 63, the separator 22 is also driven in the front-rear direction (X1-X2 direction).

As illustrated in FIG. 7, an encoder 70 that detects the rotation angle of the third pulley 43 as the driven-side pulley is provided behind the third pulley 43. This configuration and operation allows the first pulley 41, the third pulley 43, and the encoder 70 to be located on the central axis Ad and therefore contributes to a reduced size of the holding body 10.

As illustrated in FIGS. 7 and 8, the encoder 70 is composed of a plurality of approximately disk-shaped members centered on the above central axis Ad and includes a restriction plate 71, a base plate 72, a holding plate 73, and a detector 74 in this order from the third pulley 43 side. Among these, the restriction plate 71, the base plate 72, and the detector 74 are fixed with respect to the holding body 10.

As illustrated in FIG. 7, the cable 82 and a guide plate 81 are provided behind the encoder 70. The cable 82 is for the drive signal to the driver 63 for driving the separator 22 back and forth. The guide plate 81 is for defining the wiring position of the cable 82 while preventing contact between the cable 82 and the holding plate 73.

In the above configuration, the motor 32, the first pulley 41, the third pulley 43, and the encoder 70 are arranged in this order from the front in the X1-X2 direction. That is, the motor 32 and the encoder 70 are arranged on the front side (insertion member side) and the rear side, respectively, so as to interpose the first pulley 41 and the third pulley 43. The motor 32 is a heavier component than the encoder 70, and therefore if the motor 32 and the insertion member can be brought close to each other, this configuration will contribute to a reduced size of the holding body 10. This configuration will also contribute to the improvement of the operability of the holding body 10 because the motor 32 can be arranged near the center of gravity of the holding body 10.

As illustrated in FIGS. 9A and 9B, the holding plate 73 includes a shaft 73a and a ring plate-shaped rotating plate 73b. The shaft 73a extends frontward from the inside of the holding plate 73, and the rear end of the shaft 73a is fixed to the rotating plate 73b housed in the holding plate 73. The shaft 73a and the rotating plate 73b are concentrically integrated around the central axis Ad. While the holding plate 73 is fixed to the holding body 10, the shaft 73a and the rotating plate 73b are rotatable relative to the holding plate 73 around the central axis Ad.

The front end portion of the shaft 73a is inserted in a hole portion 43c (see FIG. 10) that penetrates through the third pulley 43 in the thickness direction (X1-X2 direction) along the central axis Ad, and is fixed to the hole portion 43c by a fixing pin (not illustrated). With this configuration, when the third pulley 43 rotates, the shaft 73a and the rotating plate 73b also rotate around the central axis Ad.

As illustrated in FIGS. 9A and 9B, the holding plate 73 faces the detector 74 in the X1-X2 direction. A sensor portion 74b is provided on a part of a front surface 74a of the detector 74 in the circumferential direction. The sensor portion 74b is arranged so as to face a part of the rotating plate 73b of the holding plate 73 in the circumferential direction.

The rotating plate 73b and the sensor portion 74b constitute a rotary encoder. Various types of rotary encoders can be used. For example, in the case of an optical reflection type, the sensor portion 74b includes a light source and a light receiving element, and the rotating plate 73b is provided periodically with reflective surfaces and non-reflective surfaces at regular intervals along the circumferential direction. The light source of the sensor portion 74b emits light in accordance with a control signal given from the controller 31, and the controller 31 receives a detection signal (detection result) by the light receiving element. The control signal given to the above light source is synchronized with the drive signal given from the controller 31 to the motor 32. In such a configuration, the light receiving element receives the light which is emitted from the light source and reflected by the reflecting surface, and on the basis of the light receiving result and the control signal given to the light source, the rotation direction and rotation position (angle position) of the rotating plate 73b and the third pulley 43, which rotates with the rotating plate 73b, can be detected.

Here, various types of rotary encoders can be used, but the use of an absolute encoder allows for the detection of an absolute angle position; therefore, if the absolute angle position when the power of the robot is turned off is stored in a storage device in the controller 31, initialization is not required at the next power-on, and quick detection work can thus be possible.

As illustrated in FIG. 7, the restriction plate 71 has a front surface 71a, which faces a rear surface 43a of the third pulley 43 in the X1-X2 direction along the central axis Ad.

As illustrated in FIG. 8, the front surface 71a of the restriction plate 71 is provided with a restriction portion 71b that is provided so as to extend toward the third pulley 43 side. In some embodiments, the restriction portion 71b may be, for example, a tab or protrusion. In some embodiments, the tab or protrusion may extend orthogonally from the front face 71a of the restriction plate 71 and may also extend in a radial direction, and a length of the protrusion in a radial direction may be greater than a width thereof in a circumferential direction, as illustrated in FIG. 8. The restriction portion 71b is provided at a predetermined position in the circumferential direction of the disc-shaped restriction plate 71.

As illustrated in FIG. 10, the rear surface 43a of the third pulley 43 is provided with a columnar protrusion 43b that is provided so as to extend toward the restriction plate 71 side. The protrusion 43b is provided at a predetermined position in the circumferential direction of the third pulley 43 having a disk-shaped outer shape. The protrusion 43b is arranged at a position corresponding to the restriction portion 71b of the restriction plate 71 in the radial direction. The protrusion 43b and the restriction portion 71b face each other.

The third pulley 43 rotates in a state of facing the restriction plate 71, but the rotation is restricted at a position at which the protrusion 43b and the restriction portion 71b of the restriction plate 71 come into contact with each other. The restriction portion 71b and the protrusion 43b therefore constitute a restriction member that restricts the rotation angle of the third pulley 43. The restriction portion 71b and the protrusion 43b are arranged at positions at which the rotation angle of the third pulley 43 does not exceed 360 degrees in accordance with the pulley ratio between the first and second pulleys 41 and 42 and the third pulley 43. In addition, the above pulley ratio is set such that the rotation angle of the third pulley 43 is steadily less than 360 degrees in accordance with the spec of the rotation angle of the insertion member. With this configuration, even when the insertion member is used with its rotation range of 360 degrees or more, there is no need to adopt a complicated configuration of a multi-encoder, a limit switch, or the like, and a rotary encoder having a simple and compact configuration can stably and reliably detect the rotation angle.

Moreover, by using the second pulley 42 as the intermediate pulley, the motor 32 and the encoder 70, which have a large size, can be arranged along the X1-X2 direction, and the size of the holding body 10 can be reduced as compared with a case in which the motor 32 and the encoder 70 are arranged in a distributed fashion.

Various modifications will be described below.

In some embodiments, the drive force by the rotation of the first pulley 41 is transmitted to the third pulley 43 via the second pulley 42, and the rotation position of the third pulley 43 is detected by the encoder 70, but in some embodiments, the second pulley 42 may be omitted and the third pulley 43 may be arranged so as to rotate around the axis of rotation Am. In this configuration, the drive force by the rotation of the first pulley 41 is directly transmitted to the third pulley 43. The rotation position of the third pulley 43 can be detected by facing the encoder 70 to the third pulley 43 in the X1-X2 direction. According to this configuration, it is possible to suppress the size in the X1-X2 direction.

When the diameter of the first pulley 41 is set larger than the diameter of the second pulley 42, the torque can be increased.

In some embodiments, a large torque can be obtained also in a configuration in which a decelerator of the motor 32 (not illustrated because it is integrated with the motor 32) is provided between the motor 32 and the first pulley 41 thereby to set the first pulley 41 and the second pulley 42 to have the same diameter.

While various embodiments have been described, the present disclosure is not limited to the above embodiments and the various embodiments may be improved or modified within the scope of the present disclosure.

Thus, it should be understood that the present disclosure is not limited to the above embodiments, but various other changes and modifications may be made therein without departing from the spirit and scope of the appended claims.

What is claimed is:

1. A rotation position detection unit provided in a medical robot in which an insertion member is held in a rotatable manner, the rotation position detection unit detecting a rotation position of the insertion member and comprising:
   a motor;
   a drive-side pulley that is connected to the motor and rotationally driven by the motor around a drive shaft of the motor;
   a driven-side pulley that rotates around a first axis of rotation;
   a transmission belt that transmits a rotational drive of the drive-side pulley to the driven-side pulley;
   a rotary encoder that is connected to the first axis of rotation and detects a rotation angle of the driven-side pulley; and
   a controller that controls drive of the motor and to which a detection result by the rotary encoder is input,
   wherein the insertion member rotates in association with a rotation of the drive-side pulley,
   a diameter of the drive-side pulley is smaller than a diameter of the driven-side pulley, and
   the controller calculates the rotation position of the insertion member based on the rotation angle of the driven-side pulley and a pulley ratio obtained by dividing the diameter of the drive-side pulley by the diameter of the driven-side pulley.

2. The rotation position detection unit according to claim 1, further comprising an intermediate pulley that rotates around a second axis of rotation,
   wherein the insertion member is connected to the second axis of rotation and rotates around the second axis of rotation,
   the transmission belt comprises:
      a first transmission belt that connects the drive-side pulley and the intermediate pulley and transmits the rotational drive of the drive-side pulley to the intermediate pulley; and
      a second transmission belt that connects the intermediate pulley and the driven-side pulley and transmits a rotational drive of the intermediate pulley to the driven-side pulley, and
   a diameter of the intermediate pulley is smaller than the diameter of the driven-side pulley.

3. The rotation position detection unit according to claim 2, wherein the diameter of the drive-side pulley and the diameter of the intermediate pulley are identical.

4. The rotation position detection unit according to claim 1, wherein based on the pulley ratio, a rotation range of the driven-side pulley is less than 360 degrees even when a rotation range of the insertion member exceeds 360 degrees.

5. The rotation position detection unit according to claim 2, wherein the motor is arranged on an insertion member side of the rotary encoder.

6. The rotation position detection unit according to claim 5, wherein the drive shaft and the first axis of rotation are arranged so as to be located coaxially.

7. The rotation position detection unit according to claim 1, further comprising a restriction member that restricts a rotation range of the driven-side pulley.

8. The rotation position detection unit according to claim 7, wherein the rotary encoder includes a plate that faces the driven-side pulley, and the restriction member comprises:
   a protrusion that is provided so as to extend toward a plate side in the driven-side pulley; and
   a restriction portion that is provided in the plate so as to extend toward a driven-side pulley side and arranged at a predetermined position on a trajectory of the protrusion that moves in association with a rotation of the driven-side pulley.

9. An apparatus comprising:
   a holder that is configured to hold a treatment tool that is configured to be inserted into a patient during surgery;
   a motor;
   a drive-side pulley that is connected to the motor and rotationally driven by the motor around a drive shaft of the motor;
   a driven-side pulley that rotates around a first axis of rotation;
   a transmission belt that transmits a rotational drive of the drive-side pulley to the driven-side pulley;
   a rotary encoder that is connected to the first axis of rotation and detects a rotation angle of the driven-side pulley; and
   a controller that controls drive of the motor and to which a detection result by the rotary encoder is input,
   wherein the holder rotates in association with a rotation of the drive-side pulley,
   a diameter of the drive-side pulley is smaller than a diameter of the driven-side pulley, and
   the controller calculates a rotation position of the holder based on the rotation angle of the driven-side pulley and a pulley ratio of the diameter of the drive-side pulley to the diameter of the driven-side pulley.

10. The apparatus according to claim 9, wherein the rotary encoder is an absolute encoder.

11. The apparatus according to claim 9, further comprising an intermediate pulley that rotates around a second axis of rotation,
   wherein the holder is connected to the intermediate pulley and rotates around the second axis of rotation,
   the transmission belt comprises:
      a first transmission belt that connects the drive-side pulley and the intermediate pulley and transmits the rotational drive of the drive-side pulley to the intermediate pulley; and
      a second transmission belt that connects the intermediate pulley and the driven-side pulley and transmits a rotational drive of the intermediate pulley to the driven-side pulley, and
   a diameter of the intermediate pulley is smaller than the diameter of the driven-side pulley.

12. The apparatus according to claim 11, wherein the diameter of the drive-side pulley and the diameter of the intermediate pulley are identical.

13. The apparatus according to claim 9, wherein a rotation range of the driven-side pulley is less than 360 degrees even when a rotation range of the holder exceeds 360 degrees.

14. The apparatus according to claim 11, wherein the motor is arranged on a holder side of the rotary encoder.

15. The apparatus according to claim 9, wherein the drive shaft of the motor and the first axis of rotation are coaxial.

16. The apparatus according to claim 9, further comprising a restriction member that restricts a rotation range of the driven-side pulley.

17. The apparatus according to claim 16, wherein the rotary encoder includes a restriction plate that faces the driven-side pulley, and the restriction member comprises:
- a first protrusion in the driven-side pulley; and
- a second protrusion in the restriction plate, the second protrusion being arranged at a position on a trajectory of the first protrusion such that an engagement of the first protrusion with the second protrusion restricts the rotation angle.

18. The apparatus according to claim 9, wherein the rotary encoder comprises a restriction plate, a base plate, a holding plate, and a detector arranged in order along the first axis of rotation.

19. An apparatus comprising:
- a motor having a drive shaft extending along a first axis;
- a drive-side pulley that is connected to the drive shaft of the motor;
- a holder that is configured to hold a treatment tool that is configured to be inserted into a patient during surgery, the holder rotating in association with the drive-side pulley;
- a driven-side pulley that rotates around the first axis, a diameter of the drive-side pulley being smaller than a diameter of the driven-side pulley;
- a transmission belt that transmits a rotational drive of the drive-side pulley to the driven-side pulley;
- a rotary encoder that is provided on the first axis and detects a rotation angle of the driven-side pulley; and
- a controller that calculates a rotation position of the holder based on the rotation angle and based on a pulley ratio of the drive-side pulley to the driven-side pulley, and controls the motor based on the rotation position.

* * * * *